J. E. FAWCETT.
SHIELD FOR PNEUMATIC TIRES.
APPLICATION FILED APR. 20, 1912.
1,077,267.
Patented Nov. 4, 1913.
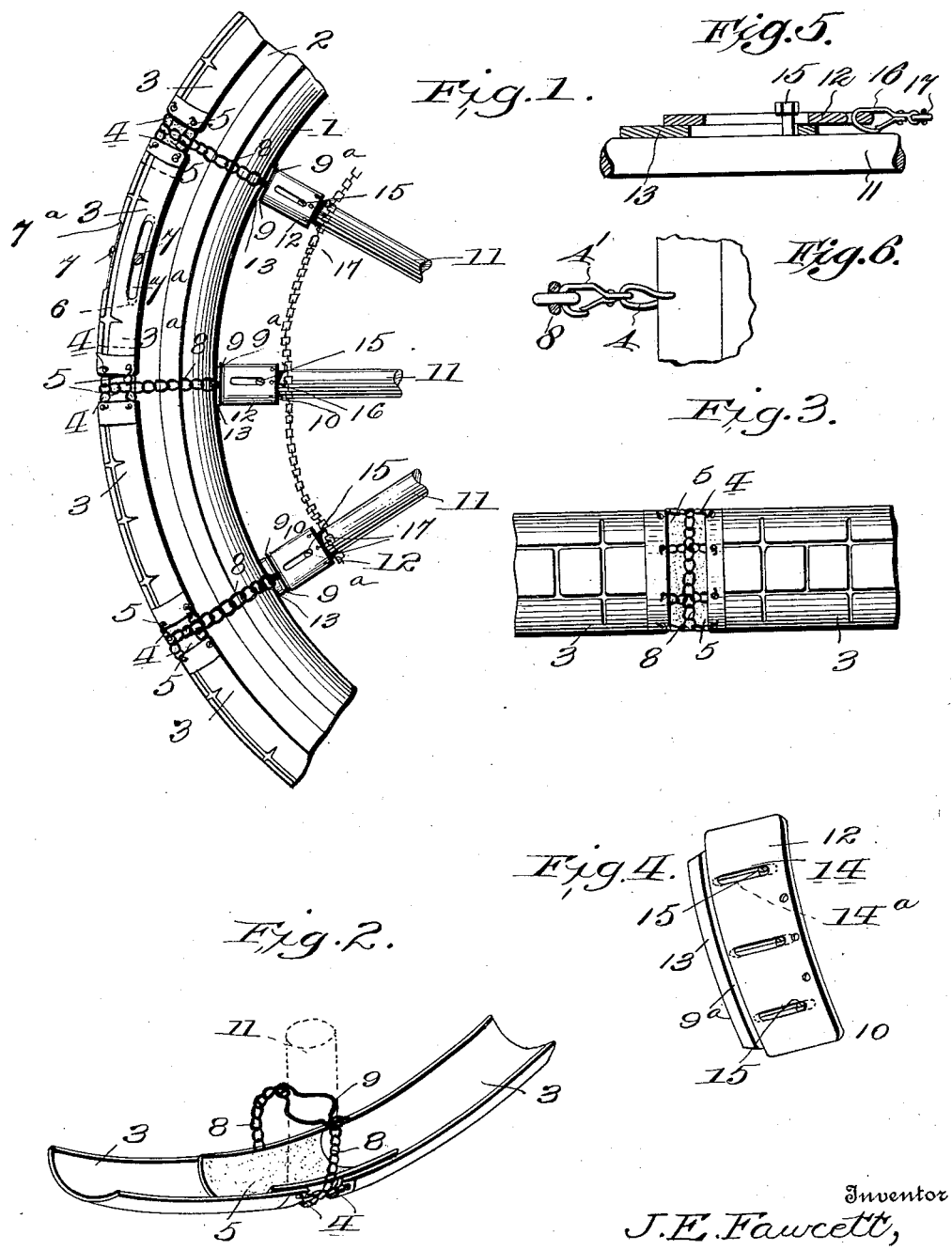

UNITED STATES PATENT OFFICE.

JAMES E. FAWCETT, OF PLATTEVILLE, WISCONSIN.

SHIELD FOR PNEUMATIC TIRES.

1,077,267.  Specification of Letters Patent.  Patented Nov. 4, 1913.

Application filed April 20, 1912. Serial No. 692,163.

*To all whom it may concern:*

Be it known that I, JAMES E. FAWCETT, a citizen of the United States, residing at Platteville, in the county of Grant and State of Wisconsin, have invented certain new and useful Improvements in Shields for Pneumatic Tires, of which the following is a specification.

This invention relates to tire shields, and has for its object the provision of a device of this character made up of hingedly connected sections, cast, stamped or pressed into shape, which serve not only to protect the tire, but also constitute means for preventing skidding.

A further object is to provide positive means for preventing side shifting or creeping of the shield.

With these and other objects in view, the invention consists in the novel details of construction and combinations of parts more fully hereinafter described, and particularly pointed out in the claims.

In the accompanying drawings the preferred form of the invention has been shown.

In said drawings:—Figure 1 is a side elevation of a portion of a wheel having my invention applied thereto; Fig. 2 is an inverted perspective view of two shields hingedly connected showing the fastening means; Fig. 3 is a top plan view of two shield sections; and Fig. 4 is a perspective view of the collar in unfolded position. Fig. 5 is a detail showing portions of certain sleeves and other connections. Fig. 6 is a detail showing the connection of the shield to certain chains.

Referring to the figures by characters of reference, 1 designates a wheel of the ordinary construction having a pneumatic tire 2 thereon. The shield adapted to be used on the tire is made up, preferably, of twelve arcuate sections 3 formed of metal and each of which is bowed transversely to conform to the transverse contour of the tire. These twelve sections are flexibly connected together by chains 4 and hinges 5 which are preferably flexible sheets. One of said sections is provided with a supplemental member 3ª provided with the slots 6 through which operate screws 7. These screws 7 also pass through slots 7ª in the adjusting section 3 to allow for increasing or decreasing the circumference of the shield.

The chains 4, by means of snap hooks 4', attach to chains 8 passing around the tread portion of the shield over the hinges 5. The ends of the chains 8 are connected by hooks to links 9 which operate in grooves 9ª and pass around collars 10 adapted to be bent around the spokes 11. These collars consist of two members 12, 13, the members 12 being provided with slots 14, and the members 13 with slots 14ª. Guides or screws 15 ride in these slots and allow for shortening or lengthening the collars and also for holding the said collars fast on their respective spokes. The members 12 of the collars 10 may be provided with snap hooks 16 for engaging chains 17 which may be fastened to the hub or pass circumferentially around the wheel.

It is obvious that those skilled in the art may vary the details of construction and combinations of parts, without departing from the spirit of my invention.

Having thus described the invention, what I claim as new and desire to protect by Letters Patent is:—

1. A tire shield arranged to fit over a wheel tread; in combination with means for retaining the shield in position comprising collars slidably mounted on the spokes of the wheel, chains connecting said collars with the shield, and chains connecting the several collars.

2. The combination with a wheel having spokes and a tire; of a shield fitted on said tire, sleeves comprising telescopic sections mounted on said spokes, a chain having its ends connected to one of the sections on a respective spoke and passing around said shield, lateral chains carried by the shield provided with hooks engaging the first mentioned chains, a chain extending around said wheel and lying inwardly of said sleeves, hooks connecting the last mentioned chain with the remaining sections of the sleeves, and locking means to hold sleeve sections in adjustable relation to each other and the spokes.

In testimony whereof I affix my signature in presence of two witnesses.

JAMES E. FAWCETT.

Witnesses:
JAMES HENDERSHOT,
BENJ. WEBSTER.

Copies of this patent may be obtained for five cents each, by addressing the "Commissioner of Patents, Washington, D. C."